March 22, 1960 L. B. WENNER 2,929,394
FLOW CONTROL DEVICE
Filed Aug. 16, 1956

WITNESSES
Robert G. Baird

INVENTOR
Lee B. Wenner.
BY
Robert T. French
ATTORNEY

2,929,394
FLOW CONTROL DEVICE

Lee B. Wenner, Overland Park, Kans., assignor to Westinghouse Electric Corporation, East Pittsburgh, Pa., a corporation of Pennsylvania Application August 16, 1956, Serial No. 604,486

4 Claims. (Cl. 137—107)

This invention relates to the fuel system of a gas turbine power plant and in particular to fuel dumping devices therefor.

At the time of shutdown of a gas turbine power plant, it is desirable to rapidly terminate the fuel supply to the combustion chambers. However, a certain amount of residual fuel, that is, fuel in the lines which is traveling to the combustion chambers at the time of shutdown, will tend to drain into the combustion chambers and to support combustion even after the operator has signalled for the power plant to shutdown.

In view of the foregoing, it is an object of this invention to provide a fuel dumping device which will prevent the residual fuel in the system from draining into the combustion chamber, thus preventing the combustion of the residual fuel after shutdown.

Another object of this invention is to provide a fuel dumping device of reduced dimensions and having fewer component parts, thus reducing potential leakage paths.

One embodiment of the present invention provides in a fuel system a fuel dumping device comprising a check valve and a dump valve cooperating with a bellows defining therewith an expansible chamber. The check valve is constructed so as to restrict the flow upon a predetermined drop in pressure. Downstream of the check valve is located the bellows which is in communication with the fluid upstream of the check valve, and which is connected to the dump valve. The bellows controls the dump valve in response to the inlet fluid pressure. Upon a predetermined drop in the inlet fluid pressure, the check valve closes and the dump valve opens, allowing the fluid in the fuel line downstream of the check valve to drain out through a dump outlet.

Figure 1:
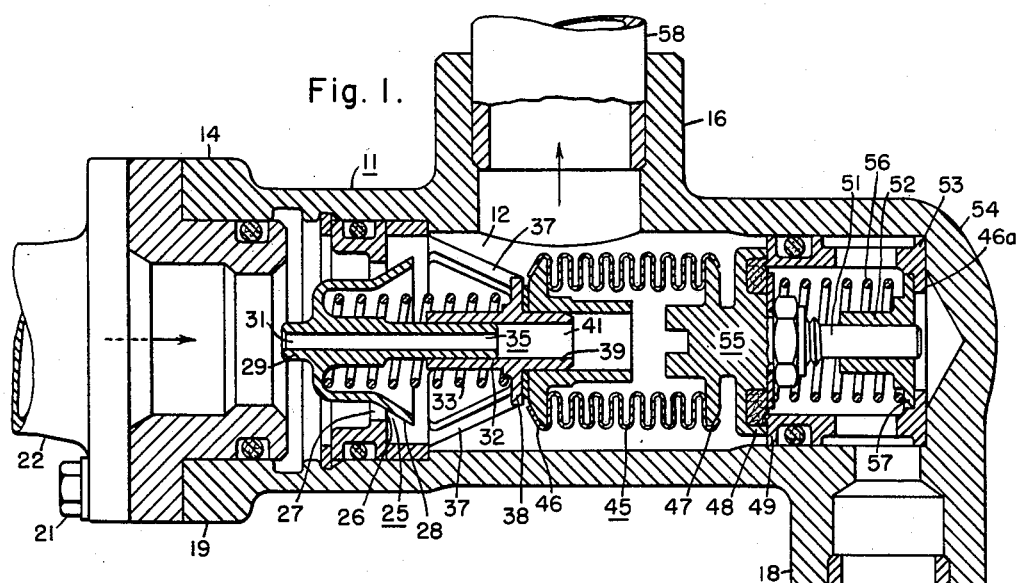
Figure 2:
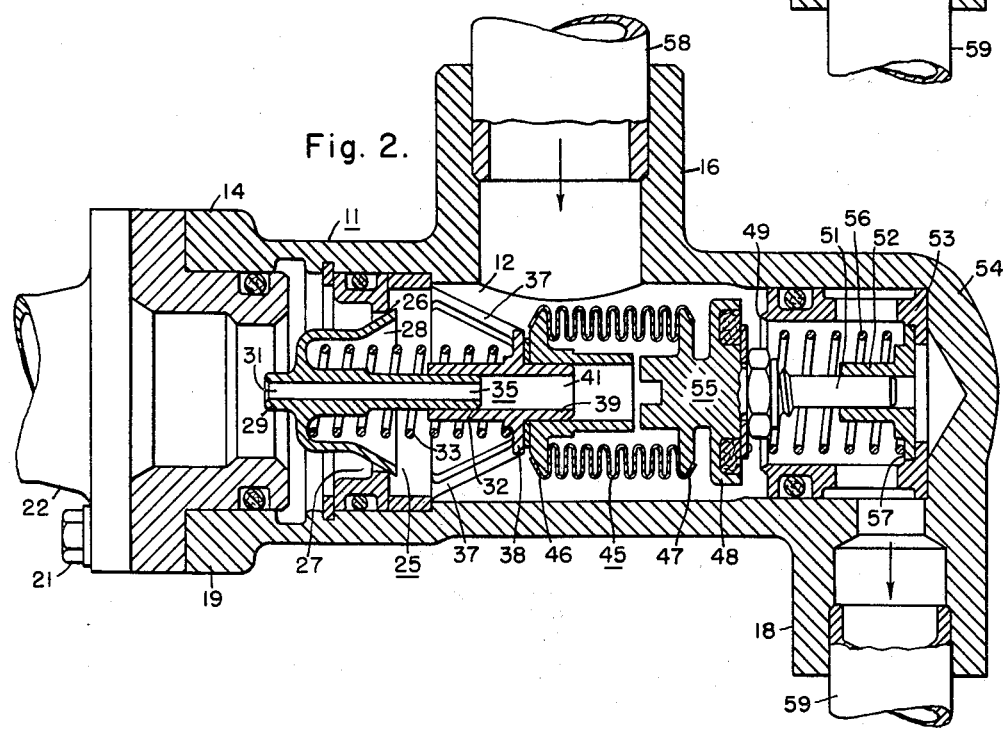

The foregoing and other objects are effected by the invention as will be apparent from the following description and claims taken in connection with the accompanying drawing, forming a part of this application, in which:

Fig. 1 is an axial sectional view of a portion of a fuel system embodying the present invention showing the fuel dumping valve closed; and Fig. 2 is an axial sectional view, similar to Fig. 1, but showing the dump valve open.

Referring to the drawing, particularly Fig. 1 and Fig. 2, there is illustrated a fuel dumping device, for use in the fuel system (not shown) of a gas turbine power plant (not shown) comprising a tubular casing 11 enclosing a chamber 12 and having a suitable fuel inlet means 14, outlet means 16 located approximately midway along the length of the casing and a dump outlet means 18. During periods of normal operation, fuel enters through the inlet 14 and discharges through the outlet 16.

The inlet 14 is provided with a flange 19 and bolting 21 suitable for connecting to a fuel supply line 22.

Adjacent to the inlet 14 and downstream thereof, there is provided a check valve 25 having an annular seat 26 secured to the tubular wall of the casing 12 and defining a valve port 27 through which all the inlet fluid passes.

The check valve is provided with a valve member 28 constructed to mate with the seat 26 and supported by a stem 29. The stem is provided with an axial opening 31 defining part of a passage 35, hereinafter described in greater detail. The stem is axially slidable within a bearing 32 supported by a plurality of arms 37 extending from the casing. The check valve 25 is mounted within the chamber 12 so that the longitudinal axis of the stem, and hence of the bearing, is parallel to that of the casing.

The inlet fluid exerts a pressure force against the check valve member 28 tending to open the check valve. This force is opposed by a spring 33 concentrically mounted on the stem 29 and the bearing 32. One end of the spring 33, the right-hand end as viewed in the drawing, is restrained by an annular shoulder 38 integral with the bearing while the left-hand is restrained by the valve member 28. The spring 33 is selected so that the valve will remain open during normal operating conditions but upon a predetermined drop in inlet pressure the spring force becomes greater than the pressure force and the valve member 28 engages the seat, thereby closing the check valve.

The bearing 32, in addition to supporting the stem 29, is provided with an extension 39, to the right as viewed in the drawing, having an opening 41 which is in communication with the opening 31 of the stem 29, thus defining the remaining portion of the passage 35. To the right of the bearing extension 39 is disposed a bellows 45 defining an expansible chamber therewithin, the expansible chamber being in communication with the passage 35 and one end 46 of the bellows 45 being secured to the bearing extension. Both the bellows and the bearing extension have their longitudinal axis parallel to the casing and coinciding with the longitudinal axis of the stem and the bearing. Hence, by means of the passage 35, the bellows is in communication with the inlet fluid at a point upstream of the check valve.

The other end of the bellows, at 47, is free to move along the longitudinal axis of the bellows in response to the pressure changes within the bellows, so that the axial length of the expansible chamber is proportional to the pressure of the inlet fluid.

Attached to the free end 47 is a valve member 48 of a dump valve 55. The valve member 48 is constructed to mate with a seat 49 secured to the casing. In normal operation, the pressure of the fluid within the bellows exerts a force seating the valve member 48. Secured to the valve member 48 is a stem 51 axially slidable in a bearing 52 supported by a ring 53. The ring 53 is secured to the right-hand end of the casing 54, as viewed in the drawing. Concentrically mounted around the stem 51 and the bearing 52 is a spring 56 restrained at the right hand end by a shoulder 57 of the bearing 52 and restrained at the left-hand end by the valve member 48. The spring 56 exerts a force which opposes the seating of the dump valve. Under normal operating conditions the force exerted by the fluid pressure in the bellows tending to close the dump valve is greater than the spring force opposing its closing and the dump valve remains seated.

When it is desired to shut down the gas turbine the fuel flow and pressure in the supply line 22 is decreased by means not shown. The device of the present invention comes into operation upon a predetermined drop in the inlet fuel pressure.

The spring 56 is selected so that, upon the attainment of the predetermined drop in the inlet fluid pressure and a consequent proportional decrease in the length of the bellows, as hereinbefore described, resulting in a reduction, in the force being exerted, (tending to seat the valve member) to a pressure which is less than the spring force (tending to open the dump valve) the dump valve 55 opens. The same inlet fluid pressure drop has permitted, in the meantime, the check valve 25 to close under pressure of the spring 33, as hereinbefore described.

Thus, upon closing of the check valve and opening of the dump valve, the residual fluid within the chamber 12, downstream of the check valve 25, and also the residual fuel in a conduit 58 which is secured to the outlet 16 drains out through a conduit 59 secured to the exhaust outlet 18 since the conduit 59 leads to a region (not shown) which is at a pressure lower than the pressure to which the outlet 16 is connected. Sufficient clearance is preferably provided between the stem 29 and the bearing 32 to allow leakage of the fuel in the fuel line 22. In this manner a portion of the fuel within the fuel line 22 is allowed to flow through the chamber 12 and the dump valve 55 to thus further decrease the fuel pressure upstream of the check valve when the engine is shut down.

In order to facilitate starting of the gas turbine, after it has been shut down for a period of time, it is desirable that the relationship between the forces exerted by the bellows 45 tending to seat the dump valve 55, the spring 56 tending to maintain the dump valve 55 open, and the spring 33 tending to close the check valve be such that the bellows 45 exerts a force sufficient to close the dump valve 55 before the check valve 25 opens.

From the foregoing, it will be apparent that the present invention provides a fuel dumping device in which the check valve, the bellows, and the dump valve cooperate to drain from the fuel system the residual fuel downstream of the check valve which would otherwise tend to enter the combustion chambers even after the operator has signalled for the power plant to shut down. The check valve is constructed so as to close and the bellows is constructed so as to permit the dump valve to open upon a predetermined drop in inlet fluid pressure and thus allow the fluid in the fuel line downstream of the check valve to drain out through the dump outlet.

While the invention has been shown in but one form it will be obvious to those skilled in the art that i is not so limited, but is susceptible of various changes and modifications without departing from the spirit thereof.

What is claimed is:

1. A flow control device comprising a tubular casing having a chamber, means defining an inlet in communication with said chamber for the flow of pressurized fluid, a check valve disposed adjacent said inlet for restricting fluid flow upon a predetermined drop in fluid pressure, a bellows disposed within the first-mentioned chamber downstream of said check valve, said bellows defining an expansible chamber therewithin, means defining a passage for the inlet fluid in communication with said expansible chamber, said bellows having a stationary end secured to said casing and a free end movable along the longitudinal axis of said bellows, means defining a dump valve having a valve member connected to said bellows at the free end, means defining an outlet in communication with said first-mentioned chamber downstream of said check valve and upstream of said dump valve, said bellows maintaining said dump valve member seated so long as the inlet fluid pressure within said expansible chamber remains above a predetermined value, means opposing the closing of said dump valve member and adjusted to open said dump valve member at substantially the same predetermined drop in inlet fluid pressure causing said check valve to close, and means defining a dump outlet in communication with said dump valve for exhausting fluid.

2. A fuel dump valve for gas turbine power plants comprising a tubular casing having a chamber, means defining an inlet in communication with said chamber for the flow of pressurized fluid, a check valve seat defining a check valve port through which the inlet fluid passes, said check valve seat being secured within said chamber downstream of and communicating with said inlet, a check valve member mating with said check valve seat, a hollow stem supporting said check valve member and having its longitudinal axis parallel to that of said casing, a bearing rigidly supported by said casing within said inner chamber, said hollow stem being axially slidable within said bearing, means urging said check valve member towards said check valve seat and closing said check valve port upon a predetermined drop in inlet fluid pressure, means defining an expansible chamber having its longitudinal axis parallel to that of said casing and disposed within the first-mentioned chamber, said third mentioned means having an end rigidly connected to said bearing and a free end movable along the longitudinal axis of said third mentioned means, said hollow stem and bearing defining a passage enabling inlet fluid to enter the expansible chamber, a dump valve having a valve member secured to the free end of said third mentioned means and a dump valve seat rigidly connected to said casing, said third mentioned means exerting a force maintaining said dump valve member seated so long as the inlet fluid pressure within said expansible chamber remains above a predetermined value, means defining an outlet in communication with said first-mentioned chamber downstream of said check valve and upstream of said dump valve, spring means urging said dump valve member away from said dump valve seat and adjusted to open said dump valve upon substantially the same predetermined drop in inlet fluid pressure causing said check valve to close, and means defining a dump outlet in communication with said dump valve for exhausting fluid passing through said dump valve.

3. A fluid dumping device comprising a tubular casing having a chamber, means defining an inlet in communication with said chamber for the flow of pressurized fluid, a check valve disposed adjacent said inlet for restricting fluid flow upon a predetermined drop in fluid pressure, a bellows disposed within the first-mentioned chamber downstream of said check valve, said bellows defining an expansible chamber therewithin, means defining a passage for the inlet fluid in communication with said expansible chamber, said passage extending through said check valve, said bellows having a stationary end secured to said casing and a free end movable along the longitudinal axis of said bellows, a dump valve having a valve member connected to said bellows at the free end, means defining an outlet in communication with said first-mentioned chamber downstream of said check valve and upstream of said dump valve, said bellows maintaining said dump valve member seated so long as the inlet fluid pressure within said expansible chamber remains above a predetermined value, means opposing the closing of said dump valve member and adjusted to open said dump valve member at substantially the same predetermined drop in inlet fluid pressure causing said check valve to close, and means defining a dump outlet in communication with said dump valve for exhausting fluid.

4. A flow control device comprising a casing having a chamber, means defining an inlet, said inlet being the sole communication with said chamber for the flow of pressurized fluid thereto, a check valve adjacent said inlet means and movable to a closed position for substantially terminating the fluid flow to said chamber upon a predetermined drop in fluid pressure, means defining an expansible chamber disposed within the first-mentioned chamber, means defining a passage for the flow of inlet fluid to said expansible chamber, a dump valve operatively associated with said second-mentioned means, means defining an outlet in communication with said first-mentioned chamber downstream of said check valve and upstream of said dump valve, said second-mentioned means maintaining said dump valve closed during normal operation, means opposing the closing of said dump valve and adjusted to cause said dump valve to open at substantially the same predetermined drop in inlet fluid pressure causing said check valve to close, and means defining a dump outlet in communication with said dump valve for exhausting fluid passing through said dump valve.

References Cited in the file of this patent

UNITED STATES PATENTS

| | | |
|---|---|---|
| 2,643,739 | Tear | June 30, 1953 |
| 2,814,180 | Hession | Nov. 26, 1957 |

FOREIGN PATENTS

| | | |
|---|---|---|
| 858,199 | Germany | Dec. 4, 1952 |